United States Patent
Dedenok (10) Patent No.: US 9,647,975 B1
(45) Date of Patent: May 9, 2017

(54) SYSTEMS AND METHODS FOR IDENTIFYING SPAM MESSAGES USING SUBJECT INFORMATION

(71) Applicant: AO KASPERSKY LAB, Moscow (RU)

(72) Inventor: Roman A. Dedenok, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

(21) Appl. No.: 15/278,512

(22) Filed: Sep. 28, 2016

(30) Foreign Application Priority Data

Jun. 24, 2016 (RU) .................................. 2016125278

(51) Int. Cl.
G06F 17/30 (2006.01)
G06F 17/27 (2006.01)
H04L 12/58 (2006.01)
G06F 21/62 (2013.01)

(52) U.S. Cl.
CPC .............. *H04L 51/22* (2013.01); *H04L 51/12* (2013.01); *H04L 51/28* (2013.01)

(58) Field of Classification Search
CPC ......... H04L 51/12; H04L 51/02; H04L 51/04; H04L 51/22; H04L 51/063; H04L 51/14; H04L 51/24; H04L 12/585; H04L 12/583; H04L 63/0263; H04L 63/1433; H04L 63/145; H04L 12/586; H04L 43/10; H04L 51/28; G06N 7/005; G06N 99/005; G06Q 10/107; G06F 21/50; G06F 21/55; G06F 17/248; G06F 17/3053; G06F 17/301; G06F 17/30985; G06F 17/277; G06F 17/2775; G06F 17/30705; G06F 17/30707; G06F 17/30873; G06F 21/562; G06F 2221/2101
USPC ....... 709/206, 224, 213, 200, 203, 207, 225, 709/232; 707/736, 737, 740, 748; 706/20
See application file for complete search history.

(56) References Cited

U.S. PATENT DOCUMENTS

| | | | |
|---|---|---|---|
| 6,507,866 B1 | 1/2003 | Barchi | |
| 6,778,941 B1 * | 8/2004 | Worrell | G06Q 10/107 702/176 |
| 7,089,241 B1 * | 8/2006 | Alspector | G06Q 10/107 |
| 7,555,523 B1 | 6/2009 | Hartmann | |
| 7,890,441 B2 | 2/2011 | Prakash et al. | |

(Continued)

*Primary Examiner* — Alina N Boutah
(74) *Attorney, Agent, or Firm* — Patterson Thuente Pedersen P.A.

(57) ABSTRACT

Systems and methods for identifying a spam email message. A system can include a rules database configured to store a plurality of ratio determination rules, a vectors database configured to store a plurality of known vectors, a message processing tool configured to receive an email message, a gram building tool configured to build a k-skip-n-gram set of word combinations according he ratio determination rules, a vector building tool configured to receive the k-skip-n-gram set of word combinations, and build a vector for each k-skip-n-gram word combination, and a spam identification tool configured to determine a spam presence threshold based on the cosine similarity for each k-skip-n-gram word combination and the plurality of known vectors for the particular email message subject field subject category, and determine that the email message contains spam when the spam presence threshold is exceeded.

20 Claims, 4 Drawing Sheets

(56) References Cited

U.S. PATENT DOCUMENTS

| | | | |
|---|---|---|---|
| 7,899,871 B1* | 3/2011 | Kumar | G06Q 10/107 |
| | | | 709/206 |
| 7,912,907 B1 | 3/2011 | Mantel et al. | |
| 7,945,627 B1 | 5/2011 | Musat | |
| 7,971,150 B2 | 6/2011 | Raskutti et al. | |
| 8,001,195 B1 | 8/2011 | Kalinin | |
| 8,078,625 B1 | 12/2011 | Zhang et al. | |
| 9,027,127 B1* | 5/2015 | Soldo | H04L 63/1425 |
| | | | 705/14.2 |
| 9,280,747 B1 | 3/2016 | Jin et al. | |
| 9,355,245 B2 | 5/2016 | Zheleva | |
| 2004/0148330 A1* | 7/2004 | Alspector | G06Q 10/107 |
| | | | 709/200 |
| 2004/0243774 A1* | 12/2004 | Horvitz | G06F 17/30067 |
| | | | 711/161 |
| 2005/0060643 A1* | 3/2005 | Glass | G06F 17/241 |
| | | | 715/205 |
| 2005/0120019 A1 | 6/2005 | Rigoutsos et al. | |
| 2005/0149546 A1* | 7/2005 | Prakash | G06F 17/30707 |
| 2005/0193073 A1 | 9/2005 | Mehr et al. | |
| 2006/0089924 A1* | 4/2006 | Raskutti | G06F 17/3071 |
| 2006/0095521 A1* | 5/2006 | Patinkin | G06Q 10/107 |
| | | | 709/206 |
| 2006/0149820 A1 | 7/2006 | Rajan et al. | |
| 2007/0208613 A1* | 9/2007 | Backer | G06Q 10/107 |
| | | | 715/234 |
| 2008/0077570 A1* | 3/2008 | Tang | G06F 17/30684 |
| 2009/0132669 A1 | 5/2009 | Milliken et al. | |
| 2009/0307213 A1* | 12/2009 | Deng | G06F 17/30705 |
| 2010/0011071 A1* | 1/2010 | Zheleva | G06F 21/55 |
| | | | 709/206 |
| 2010/0211605 A1* | 8/2010 | Ray | G06F 17/30023 |
| | | | 707/780 |
| 2010/0268661 A1* | 10/2010 | Levy | G06Q 30/02 |
| | | | 705/347 |
| 2013/0018906 A1 | 1/2013 | Nigam et al. | |
| 2013/0041652 A1* | 2/2013 | Zuev | G06F 17/2755 |
| | | | 704/8 |
| 2013/0191469 A1 | 7/2013 | Dichiu et al. | |
| 2014/0201126 A1* | 7/2014 | Zadeh | G06K 9/627 |
| | | | 706/52 |
| 2014/0280207 A1* | 9/2014 | Renders | G06F 17/3053 |
| | | | 707/748 |
| 2014/0359480 A1* | 12/2014 | Vellal | H04L 51/16 |
| | | | 715/752 |
| 2015/0100678 A1 | 4/2015 | Quisel et al. | |
| 2015/0215253 A1 | 7/2015 | Vemuri et al. | |
| 2016/0142390 A1* | 5/2016 | Draegen | H04L 63/08 |
| | | | 726/9 |
| 2016/0148325 A1* | 5/2016 | Dhawan | G06Q 30/0269 |
| | | | 705/14.66 |
| 2016/0156580 A1* | 6/2016 | Krka | H04L 51/14 |
| | | | 709/206 |
| 2016/0224636 A1* | 8/2016 | Kutzkov | G06F 17/30539 |
| 2016/0344770 A1* | 11/2016 | Verma | H04L 63/1483 |
| 2017/0024662 A1* | 1/2017 | Warn | G06N 99/005 |
| 2017/0068904 A1* | 3/2017 | Korycki | G06N 99/005 |

* cited by examiner

FIG. 1A

FIG. 1B $$similarity = \cos(\theta) = \frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}}$$

$sim(d, q) = \cos \theta$

SYSTEMS AND METHODS FOR IDENTIFYING SPAM MESSAGES USING SUBJECT INFORMATION

RELATED APPLICATION

This Application claims the benefit of Russian Application No. 2016125278 filed Jun. 24, 2016, the disclosure of which is incorporated by reference herein.

TECHNICAL FIELD

Embodiments relate generally to information security and more particularly to systems and methods for identifying spam messages.

BACKGROUND

Internet advertising is one of the cheapest types of advertising. Internet-based spam messaging is the most prevalent type of Internet advertising, accounting for 70% to 90% of the total volume of email traffic. Spam is mass sending of advertising or other kinds of information to persons who did not solicit them. Spam includes messages sent by email, by instant messaging protocols, on social networks, blogs, dating websites, forums, as well as SMS and MMS messages.

The increased volume of spam raises a number of technical, economic, and criminal issues. Such issues include heavy loads on data transfer equipment and other resources, user time for message processing, and message content shifting towards fraud and theft. Plainly, there is an urgent need to detect and control spam.

There are many ways to counter spam. One of the most effective ways is to use anti-spam software, such as anti-span applications for identifying and removing undesirable spam messages. Anti-spam applications can use methods that help to filter and remove spam. Such methods are often based on analysis of word combinations and check sums from word combinations of the message text.

For example, U.S. Pat. No. 7,555,523 describes a system where letter sequences of a message body are analyzed using n-grams of various lengths. The conclusion as to whether a message contains spam is made based on a search for similar sequences from a database of spam-containing sequences.

SUMMARY

In an embodiment, a system for identifying a spam email message comprises a computing platform including computing hardware of at least one processor, a memory operably coupled to the at least one processor and configured to store instructions invoked by the at least one processor, an operating system implemented on the computing hardware, and input/output facilities; a rules database configured to store a plurality of ratio determination rules including a set of conditions for a text string for which the rules are applied to determine an n-value of words in a gram and a k-value of words to skip in an input text; a vectors database configured to store a plurality of known vectors, wherein the plurality of known vectors are classified by thematic category; instructions that, when executed on the computing platform, cause the computing platform to implement: a message processing tool configured to receive an email message via the input/output facilities, the email message containing a subject field, a gram building tool configured to build a k-skip-n-gram set of word combinations according to the ratio of the k-value and the n-value for the subject field as the input text as determined by the ratio determination rules in the rules database, a vector building tool configured to receive, from the gram building tool, the k-skip-n-gram set of word combinations, and build a vector for each k-skip-n-gram word combination, and a spam identification tool configured to determine a spam presence threshold based on the cosine similarity for each k-skip-n-gram word combination and the plurality of known vectors for the particular email message subject field thematic category, and determine that the email message contains spam when the spam presence threshold is exceeded.

In an embodiment, a method for identifying a spam email message comprises receiving an email message, the email message containing a subject field text; determining at least one parameter of the subject field text; determining an n-value of words in a gram and a k-value of words to skip in the subject field text based on the at least one parameter of the subject field text a plurality of ratio determination rules; building a k-skip-n-gram set of word combinations of the subject field text according to the ratio of the k-value and the n-value; building a vector for each k-skip-n-gram word in the set of word combinations; calculating a cosine similarity for each k-skip-n-gram word combination and a plurality of known vectors, wherein the plurality of known vectors are classified by thematic category; determining a message thematic category based on the calculated rates of cosine similarity for each k-skip-n-gram word combination to the known vectors and the classified thematic categories of the known vectors; determining a spam presence threshold based on the cosine similarity for each k-skip-n-gram word combination and the plurality of known vectors for the determined email message thematic category; calculating a current spam presence value based at least on the rates of cosine similarity between all built vectors; and determining that the email message contains spam when the spam presence threshold is exceeded by the current spam presence value.

In an embodiment, a system for subject-line email analysis comprises a message processing engine communicatively coupled to an email server and configured to receive an email message, the email message containing a subject line; a gram building engine configured to build a set of word combinations for the subject-line according to the formula:

$$\left\{ w_{i_1}, w_{i_2}, \ldots, w_{i_n} \,\middle|\, \sum_{j=1}^{n} i_j - i_{j-1} < k \right\};$$

and a vector building engine communicatively coupled to the gram building engine and configured to build a vector for each word in the set of word combinations and calculate a cosine similarity for each word combination in the built set and a set of known vectors according to the formula:

$$\text{similarity} = \cos(\theta) = \frac{A \cdot B}{\|A\| \|B\|} = \frac{\sum_{i=1}^{n} A_i \times B_i}{\sqrt{\sum_{i=1}^{n} (A_i)^2} \times \sqrt{\sum_{i=1}^{n} (B_i)^3}},$$

and determine a thematic category of the email according to the calculated cosine similarity.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Request for Comments (RFC) 5322 of Internet Message Format (IMF) defines a syntax for text messages that are sent between computer users, within the framework of "electronic mail" (email) messages. A message can comprise a number of header fields (the totality of these fields is called the message header section), which can be followed by the message body. The header section is a sequence of character strings, the syntax of which is described herein with respect to FIG. 1A. The message body is a sequence of characters which follows the header section and is separated from it by a blank string; e.g. a string containing only the Carriage Return Line Feed (CRLF).

Figure 1A:
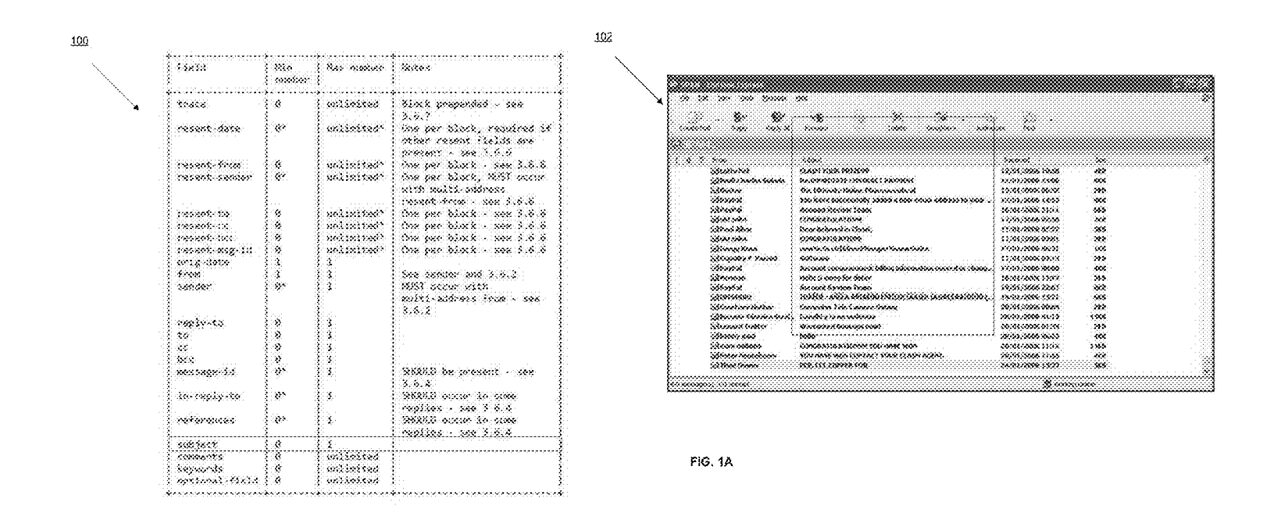
FIG. 1A is a chart illustrating header fields in an email message and a screenshot of example subject fields of an email message, according to an embodiment.

Referring to FIG. 1A, a chart 100 illustrating header fields in an email message and a screenshot of example subject fields of an email message is depicted. Embodiments described herein can analyze the message header section, and "subject" field in particular. For example, the message subject can be a short sentence which describes the purpose and the content of the message. Screenshot 102 depicts a number of subject fields displayed in a email interface.

Embodiments can identify a message containing spam using information about the message subject in the subject field of the message header. For example, referring to FIG. 2, a system 200 for identifying spam in emailed messages generally includes a message processing tool 220, a ratio determination tool 230, a vector building tool 240, a spam identification tool 250, a rules database 260, and a vectors database 270.

The system includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Figure 2:
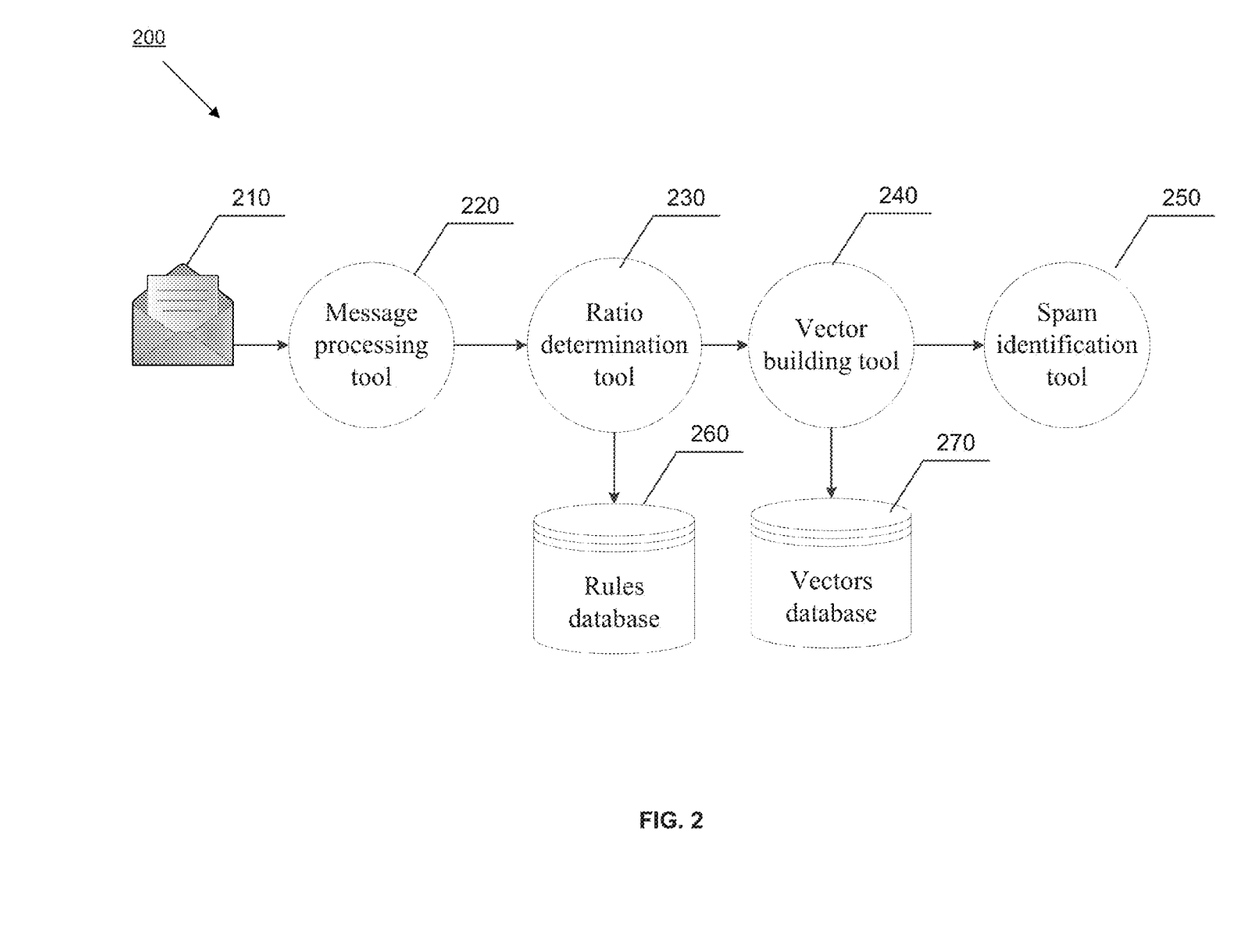
FIG. 2 is a block diagram of a system for identifying spam in an emailed message, according to an embodiment.

Message processing tool 220 is configured to receive an email message 210, identify the parameters of the message subject text, and send the message subject text and the text parameters of the message subject (once identified) to ratio determination tool 230. Therefore, in embodiments, message processing tool 220 is communicatively coupled to an email server and ratio determination tool 230. Such coupling can be via the Internet or other network.

In an embodiment, the email message received includes in its header, a message subject in text form. In a further embodiment, the message text comprises more than three words. In still other embodiments, the message subject comprises characters that can be turned into text of more than three words, such as shorthand or abbreviations.

In one embodiment, a message can be received with a subject of meaningless indivisible or indecomposable sequence of characters. Such messages can occur, for example, due to an error in message encoding. In certain embodiments, such messages can also signify a spam-containing message. In another case, a message may be received with a subject composed of multiple words. For example, analysis can be optimized with a message subject text composed of three or more words.

Parameters of the message subject text are values characterizing the substantial features of the message subject text. The parameters of the message subject text can be, for example:
    the language in which the message subject text is written;
    the number of words in the message subject text;
    the number of articles in the message subject text;
    the number of punctuation signs in the message subject text;
    the number of pronouns in the message subject text;
    the number of prepositions in the message subject text, etc.

Ratio determination tool 230 is communicatively coupled to message processing tool 220, vector building tool 240, and rules database 260. In an embodiment, ratio determination tool 230 is configured to determine the value of k and n, in order to build a k-skip-n-gram of word combinations based on the message subject text parameters using ratio determination rules from the rules database 260.

An n-gram is a sequence of word combinations composed of n words. The n value is the number of words which one word combination from the set will contain. For example, if n=2, the 2-gram (bi-gram) set built from the sentence: "Hi! Get your tickets with a discount!" will result in: "hi get; get your; your tickets; tickets with; with a; with discount; a discount."

A k-skip-n-gram is a sequence of word combinations consisting of n words, between which up to k words are skipped. Therefore, the k value denotes that the word combination, in addition to the adjoining words, can contain words one-to-k words apart from the initial word.

$$\left\{ w_{i_1}, w_{i_2}, \ldots, w_{i_n} \;\middle|\; \sum_{j=1}^{n} i_j - i_{j-1} < k \right\}$$

For example, if n=2, k=2, the set of 2-skip-bi-grams built from the above sentence will result in: "hi get; hi your; hi tickets; get your; get tickets; get with; your tickets; your with; your a; tickets with; tickets a; tickets discount; with a; with discount; a discount."

A ratio determination rule comprises a set of conditions. Ratio determination tool 230 is configured to select or calculate the most closely matching value according to the set of conditions. In embodiments, the conditions can be based on message subject text parameters. In most European languages, the k value can be influenced by the number of articles and prepositions. For example, the more articles and prepositions a language has, the lesser the k value should be. In embodiments, the number of articles in a message text in a certain language also influences the k value. In embodiments, the n value is especially affected, by parameters such as the number of pronouns or the number of prepositions in the message subject text.

In an example, the following set of conditions can comprise a rule for determining the k value: number of words in the message subject text—3 to 10; language of the message subject text—English; number of punctuation marks—3; as a result, the k value equals 2. The following set of conditions are another example of a rule for determining the k value: number of words in the message subject text—over 10; language of the message subject text—Russian; number of punctuation marks—0; as a result, the k value equals 3.

In another example, the following set of conditions can be a rule for determining the n value: the k value equals 2, the message subject text language is Spanish, the number of pronouns in the message subject text is 3; as a result, the n value equals 2. One skilled in the art will readily appreciate that these particular parameters values are provided here merely for example, and other rules can likewise be applied.

Ratio determination tool 230 is configured to build a set of k-skip-n-gram word combinations from the message subject text using the k and n values previously determined. In embodiments, ratio determination tool 230 is further configured to communicate the built set of k-skip-n-gram word combinations to vector building tool 240.

Rules database 260 comprises storage for the k value determination rules and the n value determination rule. In an embodiment, rules database 260 comprises a SQL database, although rules database 260 can also comprise data storage as implemented by general purpose database management storage systems (DBMS). In other embodiments, rules database 260 can comprise a flat file or series of files. In embodiments, rules database 260 can comprise simple non-volatile memory as part of a computer. In other embodiments, rules database 260 can comprise a relational database or series of databases. The foregoing lists in no way limit the type of database or structure of database that can be used, as these embodiments are given only by way of example and are not intended to limit the scope of embodiments.

Vector building tool 240 is configured to build a vector for each k-skip-n-gram word combination from the built set. Vector building tool 240 is further configured to calculate the cosine similarity rate for each k-skip-n-gram word combination from the built set; i.e. between each built vector and the known vectors from the vectors database 270.

Figure 1B:
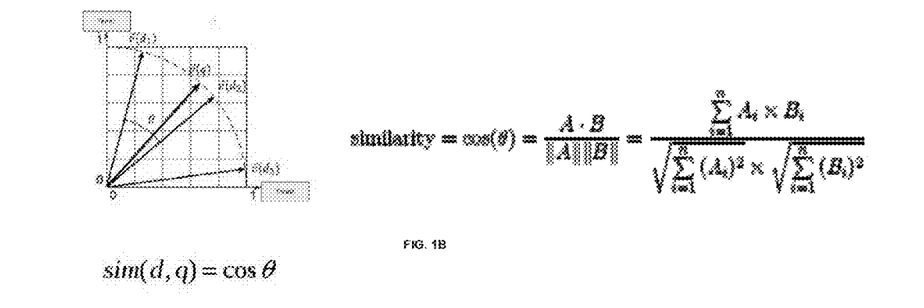
FIG. 1B is a formula of cosine similarity and a vector representation of cosine similarity executable by systems and methods, according to an embodiment.

Referring to FIG. 1B, a formula of cosine similarity and a vector representation of cosine similarity are depicted, according to an embodiment. Cosine similarity is a measure of similarity between two vectors. In particular, cosine similarity measures the cosine of the angle between the two vectors in a pre-Hilbert space. For each k-skip-n-gram word combination from the built set, a vector is built in order to calculate the cosine similarity rate. For example, for a 2-skip-bi-gram word combination from the above-mentioned "discount tickets" text, the vector for calculating the similarity rate will be the following: −2.622624 1.091368 1.221946 1.118406 0.286586 −0.477737 0.925635 −0.179525 0.212215 −1.804560 1.452010 −1.630697 −0.030821 0.525848 −1.306217 −0.847145 −0.209074 −2.020271.

Vector building tool 240 uses this vector to determine the cosine similarity with known vectors. For example, using known vectors in vectors database 270, the most similar word combinations are determined or detected. For example, the rate of cosine similarity between the vector of the word combination "discount tickets" and the vector of the word combination "sale tickets" known from the vectors database 270, once calculated, equals 0.75, while for the word combination "concert tickets", it can equal 0.79.

In embodiments, vector building tool 240 is further configured to determine a thematic category of the message. For example, the calculated rate of similarity between at least one built vector and the known vectors from the vectors database 270 can be utilized to determine a thematic category of the message.

In an embodiment, a thematic category of a message is a category containing messages, individual word combinations, or vectors similar in content or purpose of writing, which use words, word combinations or combinations of words and characters that have similar meaning and are typical for a specific theme. Many spam letters are preanalyzed, for example, using Non-negative Matrix Factorization (NMF) or are broken down into thematic categories using latent Dirichlet allocation. For example, a "financial earnings" category of spam messages can include messages containing information about additional earnings, monthly earnings amounts, opportunity for extra earnings beside a regular job, etc. Either a message or an individual word combination or a vector built from a word combination can belong to a thematic category, in embodiments.

In an embodiment, vector building tool 240 determines a thematic category of a message by the vector or a combination of vectors which, for example, have the highest rate of similarity to the known vectors from the vectors database 270 of the same theme. Accordingly, if, for example, a known vector from the vectors database 270 belongs to a specific thematic category, such as, "escort services," and one of the built vectors has a high rate of cosine similarity to it, then the received message will belong to the same category.

Vectors database 270 is configured to store known vectors used in the cosine similarity rate calculation of k-skip-n-gram word combinations. In embodiments, known vectors in the vectors database 270 are classified by thematic categories.

As described above, various database types can be used as the rules database 260 and as the vectors database 270, namely: hierarchical databases (IMS, TDMS, System 2000), network databases (Cerebrum, Cronospro, DBVist), relational databases (DB2, Informix, Microsoft SQL Server), object-oriented databases (Jasmine, Versant, POET), object-relational databases (Oracle Database, PostgreSQL, FirstSQL/J, functional databases, etc. Databases can also be updated using an anti-virus server.

As depicted in FIG. 2, vector building tool 240 is further communicatively coupled to spam identification tool 250. In embodiments, vector building tool 240 is further configured to send data about the calculated cosine similarity rates and the specific thematic category of the message to spam identification tool 250.

Spam identification tool 250 can utilize spam presence ratios to determine a probability that a message contains spam. In an embodiment, a current value of a spam presence ratio is a quantitative indicator of the presence of spam in a received message. In an embodiment, a current value of a spam presence ratio is determined using the calculated rate of cosine similarity between all vectors from a set built from the message subject text. The current value of the spam presence ratio can be calculated using, for example, the arithmetic mean of the cosine similarity rates of all built vectors. In an embodiment, spam identification tool 250 is further configured to calculate the current value of the spam presence ratio using the cosine similarity ratios of all built vectors.

In an embodiment, a limit value of a spam presence ratio is the spam presence ratio value at which a received message is considered to be a spam-containing message. The limit value of the spam presence ratio depends on the thematic category of the message. For example, for each message thematic category, the limit value of the spam presence ratio can be determined by regression analysis of test message collections. In other embodiments, the limit value of the spam presence ratio can be determined by trial and error or a brute force approach. Limit values can be entered into vectors database 270. In embodiments, limits can be adjusted depending on the number of k-skip-n-grams in the built set, the number of known vectors from the vectors database to which at least one calculated vector has a high rate of similarity, and other determined values. According to an embodiment, a limit value of a spam presence ratio is stored for each message thematic category in vectors database 270.

Spam identification tool 250 is configured to determine a limit value of the spam presence ratio, based on the message thematic category. In one embodiment, for example, the message belongs to the "escort services" thematic category. The thematic category of the message is determined on the basis of, for example, the 2-skip-2-gram "escort price", from which a vector is built in order to calculate the similarity rate. The 2-skip-2-gram "escort price" can be chosen as the determining one, because the vector built from this 2-skip-2-gram has the highest rate of similarity to three known vectors from the vectors database 270. For example, the built vector has a 0.78 rate of similarity to the first vector from the k-skip-n-gram "escort price," which is the highest one among the similarity rates for all built vectors from the built set. The built vector has a 0.69 rate of similarity to the second vector from the k-skip-n-gram "escort free," which is a high rate as well. The said vector has a 0.53 rate of similarity to the third vector from the k-skip-n-gram, "escort atmosphere." The built set has 24 2-skip-2-grams, which means that the message subject text has 10 words. Therefore, the limit ratio of spam presence for the thematic category "escort services" known from the vectors database 270 is 0.80. The limit ratio determined by spam identification tool 250, taking into account the updated data (3 vectors, 10 words), is 0.77. The update can be calculated using arithmetic formulas, as will be readily appreciated by one skilled in the art.

Spam identification tool 250 is further configured to find spam in a received message when the determined limit value of the spam presence ratio is exceeded. In an embodiment where the limit value of the spam presence ratio is not exceeded, the received message is determined to not have spam, and the system ends the operation.

Figure 3:
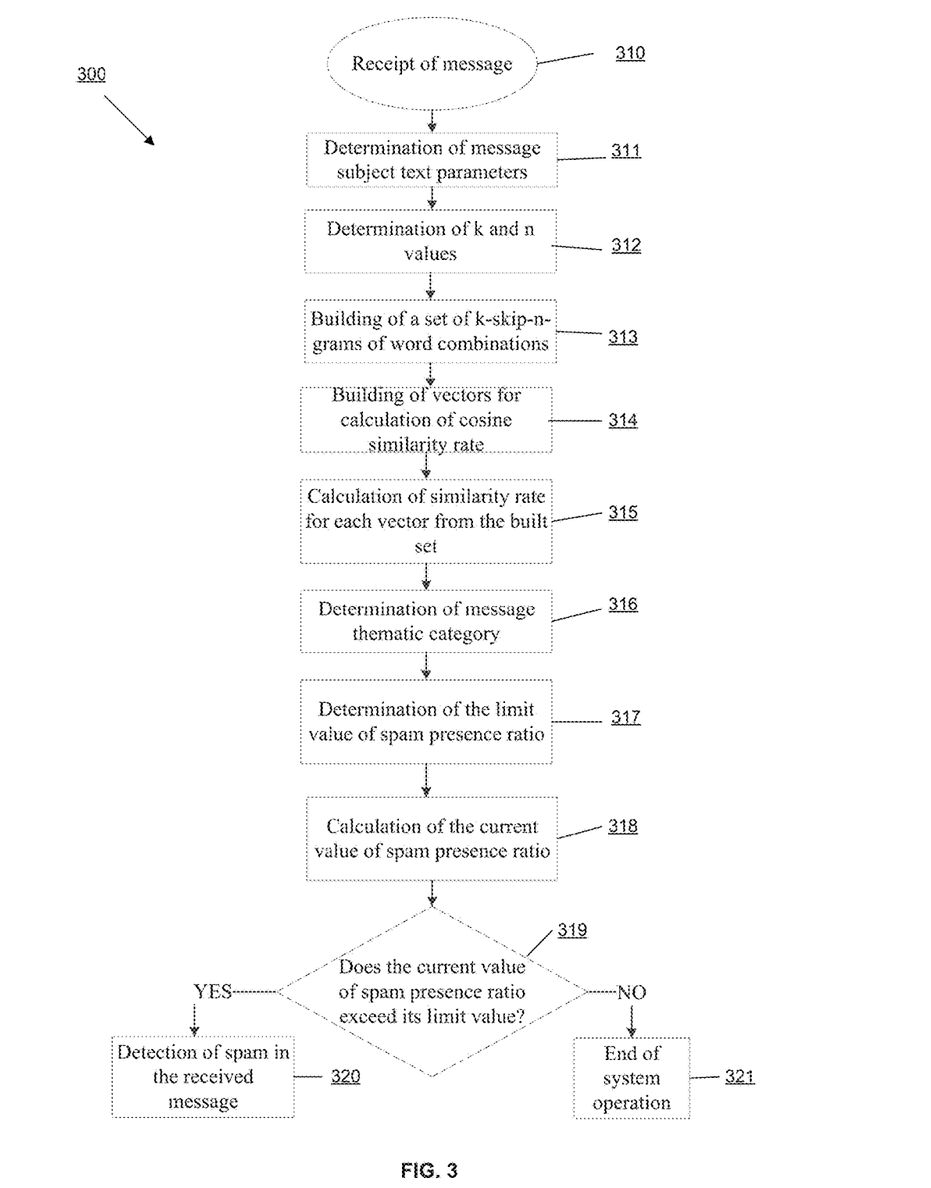
FIG. 3 is a flowchart of a method for identifying spam in an emailed message, according to an embodiment.

Referring to FIG. 3, a flowchart of a method 300 for identifying spam in an emailed message is depicted, according to an embodiment.

At 310, message processing tool 220 receives an emailed message containing a message subject in its header. In an embodiment, the message subject comprises text of more than three words.

At 311, message processing tool 220 determines the parameters of the message subject text and sends the text and the parameters of the message subject text to ratio determination tool 230.

At 312, ratio determination tool 230 determines the values of k and n, in order to build k-skip-n-grams of word combinations based on the parameters of the message subject text using ratio determination rules.

At 313, ratio determination tool 230 builds a set of k-skip-n-grams of word combinations from the message subject text, using the determined values of k and n, and sends the built set of k-skip-n-grams of word combinations to vector building tool 240.

At 314, vector building tool 240 builds a vector in order to calculate the cosine similarity rate for each k-skip-n-gram of the word combination from the built set.

At 315, for each built vector, vector building tool 240 calculates the rate of cosine similarity to the known vectors from vectors database 270.

At 316, vector building tool 240 determines the message thematic category based on the calculated rates of cosine similarity to the known vectors, and sends the data on the calculated cosine similarity rates and on the message thematic category to spam identification tool 250.

At 317, spam identification tool 250 determines the limit value of the spam presence ratio based at least on the message thematic category.

At 318, spam identification tool 250 calculates the value of the spam presence ratio based at least on the rates of cosine similarity between all built vectors.

At 319, spam identification tool 250 checks whether the calculated value of the spam presence ratio exceeds its determined limit value. If the determined limit value of the spam presence ratio is exceeded, spam identification tool 250 determines spam to be in the received message at 320. If the determined limit value of the spam presence ratio is not exceeded, the system ends its operation at 321, having determined spam to not be present in the received message.

Figure 4:
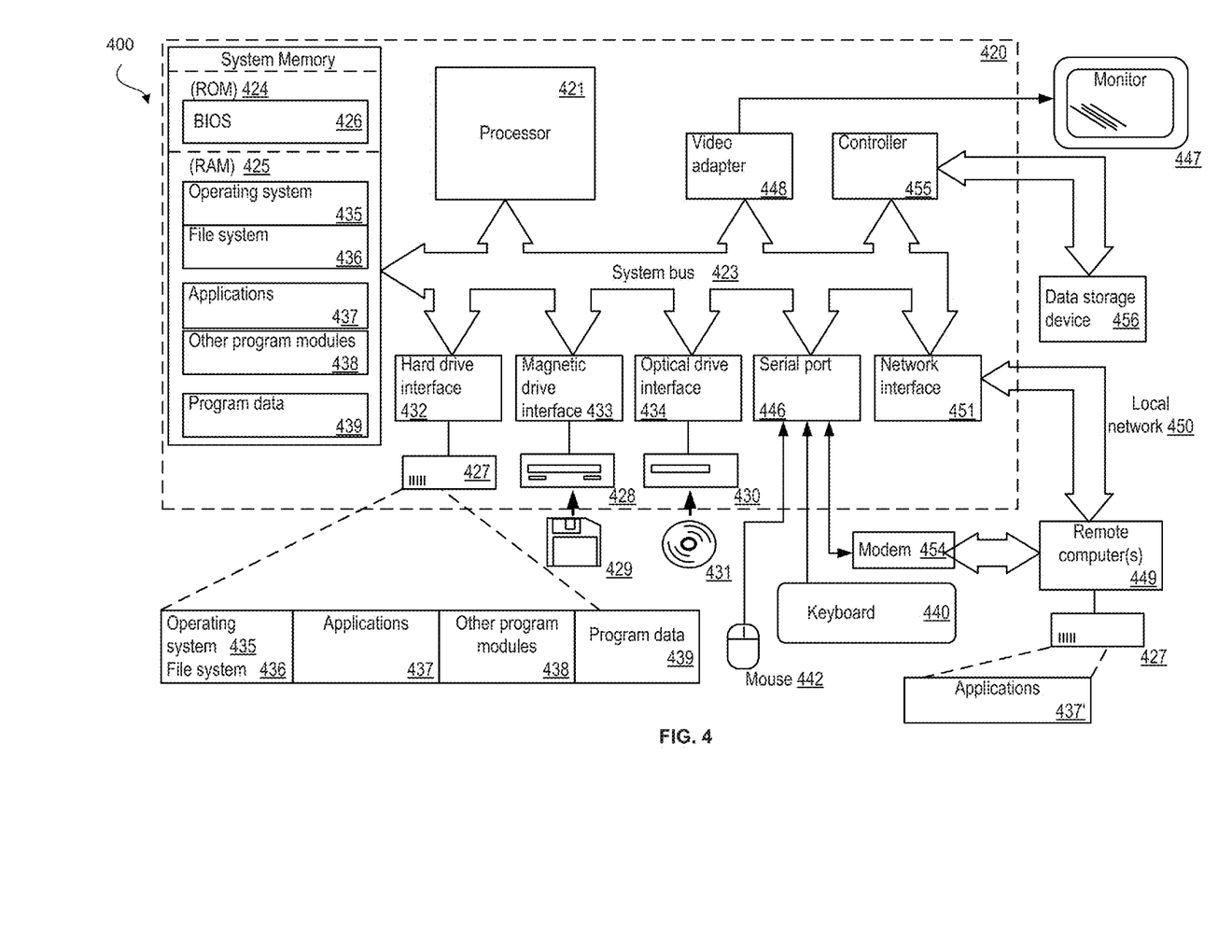
FIG. 4 is a block diagram of a computer system on which various engines can carry out a function or set of functions of the instant invention, according to embodiments.

FIG. 4 is a diagram illustrating in greater detail a computer system 400 on which aspects of the invention as described herein may be implemented according to various embodiments.

The computer system 400 can comprise a computing device such as a personal computer 420 includes one or more processing units 421, a system memory 422 and a system bus 423, which contains various system components, including a memory connected with the one or more processing units 421. In various embodiments, the processing units 421 can include multiple logical cores that are able to process information stored on computer readable media. The system bus 423 is realized as any bus structure known at the relevant technical level, containing, in turn, a bus memory or a bus memory controller, a peripheral bus and a local bus, which is able to interact with any other bus architecture. The system memory can include non-volatile memory such as Read-Only Memory (ROM) 424 or volatile memory such as Random Access Memory (RAM) 425. The Basic Input/Output System (BIOS) 426 contains basic procedures ensuring transfer of information between the elements of personal computer 420, for example, during the operating system boot using ROM 424.

Personal computer 420, in turn, has a hard drive 427 for data reading and writing, a magnetic disk drive 428 for reading and writing on removable magnetic disks 429, and an optical drive 430 for reading and writing on removable optical disks 431, such as CD-ROM, DVD-ROM and other optical media. The hard drive 427, the magnetic drive 428, and the optical drive 430 are connected with system bus 423 through a hard drive interface 432, a magnetic drive interface 433 and an optical drive interface 434, respectively. The drives and the corresponding computer information media represent energy-independent means for storage of computer instructions, data structures, program modules and other data on personal computer 420.

The system depicted includes hard drive 427, a removable magnetic drive 429 and a removable optical drive 430, but it should be understood that it is possible to use other types of computer media, capable of storing data in a computer-readable form (solid state drives, flash memory cards, digital disks, random-access memory (RAM), etc.), connected to system bus 423 through a controller 455.

The computer 420 comprises a file system 436, where the recorded operating system 435 is stored, as well as additional program applications 437, other program engines 438 and program data 439. The user can input commands and information into the personal computer 420 using input devices (keyboard 440, mouse 442). Other input devices (not shown) can also be used, such as: a microphone, a joystick, a game console, a scanner, etc. Such input devices are usually connected to the computer system 420 through a serial port 446, which, in turn, is connected to a system bus, but they can also be connected in a different way—for example, using a parallel port, a game port or a Universal Serial Bus (USB). The monitor 447 or another type of display device is also connected to system bus 423 through an interface, such as a video adapter 448. In addition to monitor 447, personal computer 420 can be equipped with other peripheral output devices (not shown), such as speakers, a printer, etc.

Personal computer 420 is able to work in a network environment; in this case, it uses a network connection with one or several other remote computers 449. Remote computer(s) 449 is (are) similar personal computers or servers, which have most or all of the above elements, noted earlier when describing the substance of personal computer 420 shown in FIG. 4. The computing network can also have other devices, such as routers, network stations, peering devices or other network nodes.

Network connections can constitute a Local Area Network (LAN) 450 and a World Area Network (WAN). Such networks are used in corporate computer networks or in corporate intranets, and usually have access to the Internet. In LAN or WAN networks, personal computer 420 is connected to the Local Area Network 450 through a network adapter or a network interface 451. When using networks, personal computer 420 can use a modem 454 or other means for connection to a world area network, such as the Internet. Modem 454, which is an internal or an external device, is connected to system bus 423 through serial port 446. It should be clarified that these network connections are only examples and do not necessarily reflect an exact network configuration, i.e. in reality there are other means of establishing a connection using technical means of communication between computers.

Therefore, embodiments providing a k-skip-n-gram analysis of the subject of an email are faster than an analysis of the body of an email. For example, a body of an email message may have 300 words, while the subject of the message may have less than 20 words. The analysis of 20 words is much quicker than the analysis of 300 words.

Further, a k-skip-n-gram analysis of the subject of an email is more accurate than the analysis of the body of an email. The body of an email can include many useless or superfluous words, phrases, or sentences. In general, the subject is the purpose and the short content of the message. It typically includes only useful words.

In another feature and advantage, embodiments can be used to identify spam email messages in a situation where the body of an email message is encrypted but the header is in cleartext. In systems that evaluate the body of an email for spam determinations, such evaluation would not be possible.

In another feature and advantage, utilizing k-skip-n-grams instead of n-grams is beneficial in email evaluation. For example, an n-gram set built based on a given text will have around 20-30% of grams of the k-skip-n-gram set built based on the same text. 80% of the grams will be unique.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. §112(f) are not to be invoked unless the specific terms "means for" or "step for" are recited in a claim.

The invention claimed is:

1. A system for identifying a spam email message, the system comprising:
    a computing platform including computing hardware of at least one processor, a memory operably coupled to the at least one processor and configured to store instructions invoked by the at least one processor, an operating system implemented on the computing hardware, and input/output facilities;
    a rules database configured to store a plurality of ratio determination rules including a set of conditions for a text string for which the rules are applied to determine an n-value of words in a gram and a k-value of words to skip in an input text;
    a vectors database configured to store a plurality of known vectors, wherein the plurality of known vectors are classified by thematic category;
    instructions that, when executed on the computing platform, cause the computing platform to implement:
        a message processing tool configured to receive an email message via the input/output facilities, the email message containing a subject field,
        a gram building tool configured to build a k-skip-n-gram set of word combinations according to the ratio of the k-value and the n-value for the subject field as the input text as determined by the ratio determination rules in the rules database,
        a vector building tool configured to receive, from the gram building tool, the k-skip-n-gram set of word combinations, and build a vector for each k-skip-n-gram word combination, and
        a spam identification tool configured to determine a spam presence threshold based on the cosine similarity for each k-skip-n-gram word combination and the plurality of known vectors for the particular email message subject field thematic category, and determine that the email message contains spam when the spam presence threshold is exceeded.

2. The system for identifying a spam email message of claim 1, wherein the plurality of ratio determination rules defining the n-value and the k-value includes an analysis by the gram building tool of at least one message subject text parameter including
    a language of the subject field;
    a quantity of words in the subject field;
    a quantity of articles in the subject field;
    a quantity of punctuation signs in the subject field;
    a quantity of pronouns in the subject field; and
    a quantity of prepositions in the subject field.

3. The system for identifying a spam email message of claim 1, wherein the k-skip-n-gram set of word combinations is built by the gram building tool according to the formula:

$$\left\{ w_{i_1}, w_{i_2}, \ldots, w_{i_n} \middle| \sum_{j=1}^{n} i_j - i_{j-1} < k \right\}$$

wherein $w_{i_1 \ldots i_n}$ is the set of words, n is the number of words in the set and the upper bound of summation, i is the index of a particular word within the set of words, j is the index of summation, and k is the number of words to skip.

4. The system for identifying a spam email message of claim 1, wherein the vector building tool is configured determine a particular email message subject field thematic category by equating a high cosine similarity between the at least one of the plurality of known vectors and at least one of the vectors built for each k-skip-n-gram word combination with the thematic category of the at least one of the plurality of known vectors.

5. The system for identifying a spam email message of claim 1, wherein the determination that the email message contains spam includes at least the arithmetic mean of the cosine similarity of all built vectors.

6. The system for identifying a spam email message of claim 1, wherein the spam presence threshold is determined by a regression analysis of a test message collection.

7. The system for identifying a spam email message of claim 6, wherein the spam presence threshold is adjusted based on a quantity of k-skip-n-gram word combinations built by the gram building tool and a quantity of the plurality of known vectors that have a high cosine similarity to at least one of the built vectors.

8. The system for identifying a spam email message of claim 1, wherein the subject field comprises text of three or more words.

9. A method for identifying a spam email message with a computing platform including computing hardware of at least one processor, a memory operably coupled to the at least one processor and configured to store instructions invoked by the at least one processor, the method comprising:

receiving an email message with a messaging processing tool invoked by the at least one processor, the email message containing a subject field text;

determining, with the messaging processing tool, at least one parameter of the subject field text;

determining, with a ratio determination tool invoked by the at least one processor, an n-value of words in a gram and a k-value of words to skip in the subject field text based on the at least one parameter of the subject field text a plurality of ratio determination rules;

building, with a gram building tool invoked by the at least one processor, a k-skip-n-gram set of word combinations of the subject field text according to the ratio of the k-value and the n-value;

building, with a vector building tool invoked by the at least one processor, a vector for each k-skip-n-gram word in the set of word combinations;

calculating, with the vector building tool, a cosine similarity for each k-skip-n-gram word combination and a plurality of known vectors, wherein the plurality of known vectors are classified by thematic category;

determining, with the vector building tool, a message thematic category based on the calculated rates of cosine similarity for each k-skip-n-gram word combination to the known vectors and the classified thematic categories of the known vectors;

determining, with a spam identification tool invoked by the at least one processor, a spam presence threshold based on the cosine similarity for each k-skip-n-gram word combination and the plurality of known vectors for the determined email message thematic category;

calculating, with the spam identification tool, a current spam presence value based at least on the rates of cosine similarity between all built vectors; and determining, with the spam identification tool, that the email message contains spam when the spam presence threshold is exceeded by the current spam presence value.

10. The method for identifying a spam email message of claim 9, wherein the at least one parameter of the subject field text comprises:

a language of the subject field text;
a quantity of words in the subject field text;
a quantity of articles in the subject field text;
a quantity of punctuation signs in the subject field text;
a quantity of pronouns in the subject field text; or
a quantity of prepositions in the subject field text.

11. The method for identifying a spam email message of claim 9, wherein building the k-skip-n-gram set of word combinations is conducted according to the formula:

$$\left\{ w_{i_1}, w_{i_2}, \ldots, w_{i_n} \middle| \sum_{j=1}^{n} i_j - i_{j-1} < k \right\}$$

wherein $w_{i1 \ldots in}$ is the set of words, n is the number of words in the set and the upper bound of summation, i is the index of a particular word within the set of words, j is the index of summation, and k is the number of words to skip.

12. The method for identifying a spam email message of claim 9, wherein determining the message thematic category comprises equating a high cosine similarity between the at least one of the plurality of known vectors and at least one of the vectors built for each k-skip-n-gram word combination with the thematic category of the at least one of the plurality of known vectors.

13. The method for identifying a spam email message of claim 9, wherein the current spam presence value is determined according to the arithmetic mean of the cosine similarity of all built vectors.

14. The method for identifying a spam email message of claim 9, wherein the spam presence threshold is determined by a regression analysis of a test message collection.

15. The method for identifying a spam email message of claim 14, wherein the spam presence threshold is adjusted based on a quantity of k-skip-n-gram word combinations built by and a quantity of the plurality of known vectors that have a high cosine similarity to at least one of the built vectors.

16. The method for identifying a spam email message of claim 9, further comprising providing a rules database accessible by the computing platform and configured to store the plurality of ratio determination rules.

17. The method for identifying a spam email message of claim 9, further comprising providing a vectors database accessible by the computing platform and configured to store the plurality of known vectors.

18. A system for subject-line email analysis on a computing platform including computing hardware of at least one processor, a memory operably coupled to the at least one processor and configured to store instructions invoked by the at least one processor, the system comprising:

instructions that, when executed on the computing platform, cause the computing platform to implement:

a message processing engine communicatively coupled to an email server and configured to receive an email message, the email message containing a subject line;

a gram building engine configured to build a set of word combinations for the subject-line according to the formula:

$$\left\{ w_{i_1}, w_{i_2}, \ldots, w_{i_n} \middle| \sum_{j=1}^{n} i_j - i_{j-1} < k \right\}$$

wherein $w_{i1 \ldots in}$ the set of words, n is the number of words in the set and the upper bound of summation, i is the index of a particular word within the set of words, j is the index of summation, and k is the number of words to skip; and a vector building engine communicatively coupled to the gram building engine and configured to build a vector for each word in the set of word combinations and calculate a cosine similarity for each word combination in the built set and a set of known vectors according to the formula:

$$\text{similarity} = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^3}},$$

and determine a thematic category of the email according to the calculated cosine similarity.

19. The system for subject-line email analysis of claim 18, further comprising: instructions that, when executed on the computing platform, cause the computing platform to implement a spam identification engine communicatively coupled to the vector building engine and configured to determine whether the email contains spam based on the thematic category and a calculated rate of cosine similarity between all vectors from a set built from the subject-line.

20. The system for subject-line email analysis of claim 19, wherein the spam identification engine is further configured to:
  determine a limit value based on the thematic category;
  determine a current value based at least on the rates of cosine similarity between all built vectors; and
  determine whether the email contains spam based on whether the current value exceeds the limit value.

* * * * *